US012351132B2

(12) United States Patent
Christopherson

(10) Patent No.: US 12,351,132 B2
(45) Date of Patent: Jul. 8, 2025

(54) COLLAPSIBLE VEHICLE INTERIOR CONSOLE

(71) Applicant: Faurecia Interior Systems, Inc., Auburn Hills, MI (US)

(72) Inventor: Sven Christopherson, West Bloomfield, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 296 days.

(21) Appl. No.: 17/971,967

(22) Filed: Oct. 24, 2022

(65) Prior Publication Data

US 2024/0131993 A1 Apr. 25, 2024
US 2024/0227683 A9 Jul. 11, 2024

(51) Int. Cl.
*B60R 7/04* (2006.01)

(52) U.S. Cl.
CPC ..................................... *B60R 7/04* (2013.01)

(58) Field of Classification Search
CPC ....... B60R 7/02; B60R 7/04; B60R 2013/015; B60R 2011/0063; B60R 2011/007; B60R 5/02; B60R 5/04; B60R 2011/0014; B60R 2011/0082; B60R 7/087; B60N 2/77; B60N 2/793; B60N 3/102; B60N 3/105; B60N 3/106; B60N 3/107; A47C 7/622; A47C 7/70; A47B 31/06

See application file for complete search history.

(56) References Cited

U.S. PATENT DOCUMENTS

| 7,201,421 B2 * | 4/2007 | Reynolds | B60R 7/02 296/37.16 |
| 7,300,088 B1 | 11/2007 | Catenacci | |
| 10,525,893 B2 | 1/2020 | Lind | |
| 2006/0065655 A1 * | 3/2006 | Taylor | A45C 7/0036 220/6 |
| 2009/0255967 A1 * | 10/2009 | Lueder | B60R 9/00 224/404 |
| 2010/0051616 A1 * | 3/2010 | Shea | B65D 81/3823 220/4.28 |
| 2010/0264180 A1 * | 10/2010 | Allotey | B60R 11/06 224/404 |
| 2015/0035308 A1 * | 2/2015 | Huebner | B60R 11/0252 296/37.8 |
| 2016/0059790 A1 * | 3/2016 | Perelli | B60R 7/04 224/486 |
| 2019/0225159 A1 * | 7/2019 | Lind | B60R 7/04 |
| 2021/0316650 A1 * | 10/2021 | Ruvalcaba | B60R 7/043 |

FOREIGN PATENT DOCUMENTS

| FR | 2919835 A1 | 2/2009 | |
| KR | 20030024982 A * | 3/2003 | ............... B60N 2/77 |
| KR | 100449292 B1 | 9/2004 | |
| WO | 2011151788 A1 | 12/2011 | |
| WO | 2020058143 A1 | 3/2020 | |

\* cited by examiner

*Primary Examiner* — Amy R Weisberg
*Assistant Examiner* — Whitney Nicole Francis
(74) *Attorney, Agent, or Firm* — Reising Ethington P.C.

(57) ABSTRACT

A collapsible vehicle interior console includes a plurality of walls and is changeable between a deployed configuration in which the walls are vertical and a stowed configuration in which the walls are horizontal. The walls change length between the two configurations such that a console body has a height that is greater than its width when deployed.

20 Claims, 4 Drawing Sheets

COLLAPSIBLE VEHICLE INTERIOR CONSOLE

TECHNICAL FIELD

The present disclosure is related generally to vehicle interiors and, more particularly, to vehicle interior components with changeable configuration.

BACKGROUND

Vehicle consoles are commonly employed adjacent individual seats in a vehicle passenger cabin, such as between the driver and passenger seats in a front row of seating or between passenger seats in another row of seating. Such consoles can provide armrests, storage compartments, or other conveniences for vehicle occupants.

In one example, PCT Application Publication No. WO 2011/151788 by Stahl et al. describes a transport box for animals or objects to be installed in the rear of a motor vehicle. The transport box consists of a floor panel, lateral walls, and at least one end wall. One of many resulting collapsible frameworks presented therein is said to include two parts which can be pushed toward each other and pivoted over a cover for opening. While disclosing the use of a collapsible compartment in a vehicle, the Stahl container is not useful as a traditional vehicle interior console due in part to its limited height when it is deployed.

SUMMARY

In accordance with one or more embodiments, a vehicle interior console includes a plurality of walls and is changeable between a deployed configuration, in which each wall is vertical, and a stowed configuration, in which each wall is horizontal. The plurality of walls defines a collapsible body having a length, a width, and a height when the console is in the deployed configuration, and the height is greater than the length, the width, or both the length and the width.

In various embodiments, the plurality of walls defines a perimeter of a storage volume when the console is in the deployed configuration. The console further includes a lid that is movable between a closed position, in which the storage volume is not accessible, and an open position in which the storage volume is accessible.

In various embodiments, one of the walls has a first portion that is movable relative to a second portion to provide lateral access to the storage volume when the console is in the deployed configuration.

In various embodiments, the console includes an annular rim. One of the walls is hingedly attached to the annular rim, and another one of the walls is releasably attached to the annular rim when the console is in the deployed configuration.

In various embodiments, the console includes a base. One of the walls is hingedly attached to one side of the base, and another one of the walls is hingedly attached to another side of the base. At least a portion of each wall pivots inward over the base when the console is changed from the deployed configuration to the stowed configuration so that the walls overlap in the stowed configuration. Each wall may be hingedly attached to the base for movement about a respective pivot axis, one axis being vertically offset from another axis so that each wall is parallel with another wall when the console is in the stowed configuration.

In various embodiments, each wall includes an upper panel and a lower panel movably attached to each other. The upper panel and the lower panel move relative to each other when the console is changed between the deployed configuration and the stowed configuration so that each wall has a length that is greater in the deployed configuration than in the stowed configuration.

In various embodiments, at least one of the walls is a foldable wall in which an upper panel and a lower panel are hingedly attached to each other. The foldable wall is unfolded when the console is in the deployed configuration and folded so that the upper and lower panels overlap when the console is in the stowed configuration.

In various embodiments, at least one of the walls is a retractable wall in which an upper panel and a lower panel are slidingly attached to each other. The retractable wall is extended when the console is in the deployed configuration and retracted so that the upper and lower panels overlap when the console is in the stowed configuration. The lower panel may be positioned above the upper panel when the console is in the stowed configuration.

In various embodiments, the height of the collapsible body is at least 50% greater than the width when the console is in the deployed configuration.

In various embodiments, the console is not removable from a vehicle in which the console is installed.

In various embodiments, the console includes a base and an annular rim arranged over the base. The collapsible body extends between the base and the annular rim and includes two end walls and two side walls that together define a perimeter of a storage volume when the console is in the deployed configuration. Each wall has a length that is greater in the deployed configuration than in the stowed configuration, and each wall is hingedly attached to at least one of the base or the annular rim and pivots inwardly over the base when the console is changed from the deployed configuration to the stowed configuration.

In various embodiments, opposite ends of each of two side walls abut inner surfaces of each of two end walls in the deployed configuration.

In various embodiments, each of two side walls is hingedly attached to the base and is retractable from an extended condition in the deployed configuration to a retracted condition in the stowed configuration. Each of two end walls is hingedly attached to the base and to the annular rim and folds from an unfolded condition in the deployed configuration to a folded condition in the stowed configuration.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is collapsible interior console for use in a vehicle. The console can be deployed to create a storage space or collapsed to create more free space inside the vehicle. In general, traditional center consoles between first row seats tend to be bulky and can present packaging challenges for vehicles with a compact interior cabin. Additionally, a traditional center console is not commonly found between two second row seats in a vehicle with a third row of seats since it can hinder access to the third-row seating area. Conventional collapsible containers are limited in height, which has prevented their use as vehicle interior consoles because consoles are typically elevated to passenger arm height to be used as an armrest and/or so passengers can easily reach inside them. The vehicle interior console described below can be configured to have a height that is greater than its length and/or width when deployed.

Figure 1:
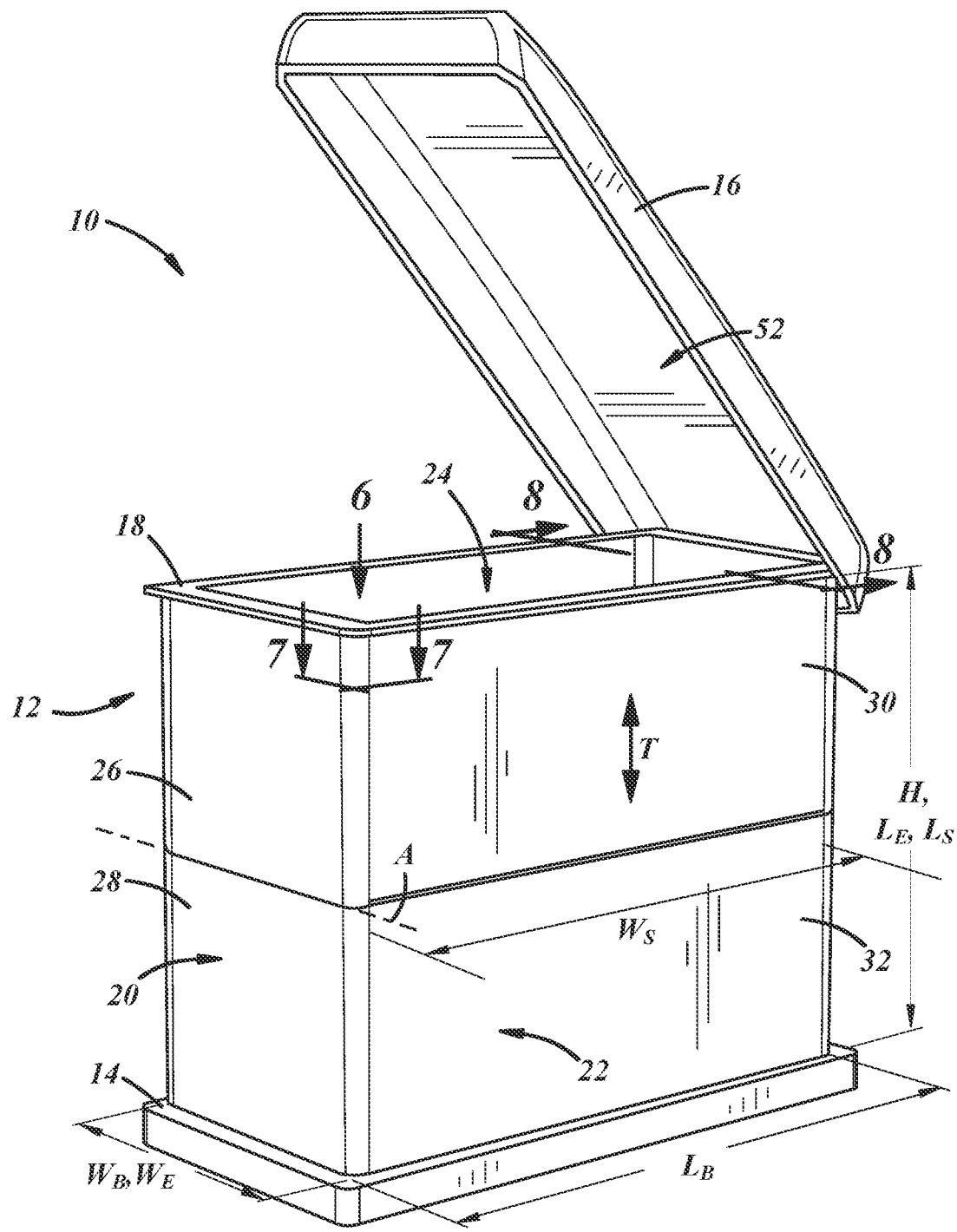
FIG. 1 is a perspective view of a collapsible vehicle interior console in a deployed configuration comprising a plurality of vertically extending walls.

With reference to FIG. 1, an illustrative vehicle interior console 10 is shown and comprises a collapsible body 12, a base 14, and a lid 16. The console 10 is changeable between a deployed configuration, as in FIG. 1, and a stowed configuration, as in FIG. 4, and may be installed between transversely spaced seating positions in a row of seating of a vehicle. As used herein, the transverse direction is a side-to-side direction across the width of the vehicle and the longitudinal direction is a front-to-back/back-to-front direction along the length of the vehicle.

The base 14 is configured for attachment to the floor of a vehicle passenger cabin and defines a footprint of the console 10. The base 14 may be permanently attached to the floor of the passenger cabin such that the console 10 is not removable from the passenger cabin without special tools. In some cases, the floor of the passenger cabin provides the base 14 or the collapsible body 12 is attached directly to the floor.

The lid 16 is coupled with the collapsible body 12 via an annular rim 18 in this example and is moveable between a closed position (see FIG. 2) and an open position as in FIG. 1 to selectively provide access to a storage volume 24 of the console 10 when the console is in a deployed configuration. Here, the lid 16 is hingedly attached to the annular rim 18. In other examples, the lid 16 is attached for sliding movement between the open and closed positions or is simply removable to achieve the open condition. The lid 16 may alternatively be attached directly to the collapsible body 12.

The collapsible body 12 includes a plurality of walls that together define a perimeter of the storage volume 24. In the illustrated example, the plurality of walls includes a pair of longitudinally spaced end walls 20 and a pair of transversely spaced side walls 22 defining a generally rectangular perimeter. Each end wall 20 includes an upper panel 26 and a lower panel 28 moveably attached to each other, and each side wall 22 includes an upper panel 30 and a lower panel 32 moveably attached to each other. In this example, each end wall 20 is a foldable wall, in which the upper and lower panels 26, 28 are hingedly attached to each other for relative rotation about a respective pivot axis A, and each side wall 22 is a telescoping or retractable wall, in which the upper and lower panels 30, 32 are slidingly coupled for relative translation in a telescoping direction T, which is perpendicular to a thickness direction of the panels.

The collapsible body 12 is located between the base 14 and the lid 16 and has a length $L_B$, a width $W_B$, and a height H. The width $W_B$ is the smaller of the longitudinal and transverse dimensions. The length $L_B$ and the width $W_B$ of the collapsible body 12 are essentially the same in the deployed and stowed configurations, but the height H may change significantly between the two configurations. In the deployed configuration, the height H of the collapsible body 12 may be greater than, or in a range from 10% to 100% greater than, its width $W_B$. In one embodiment, the height H of the collapsible body 12 is at least 50% greater than, or in a range from 50% to 100% greater than, its width $W_B$. In another embodiment, the height H of the collapsible body 12 is at least 70% greater than, or in a range from 70% to 100% greater than, its width $W_B$. In one working embodiment, the width $W_B$ is between 275 mm and 300 mm, and the height H is between 475 mm and 500 mm so that the height H is between about 60% and 80% greater than the width $W_B$.

Each end wall 20 has a length $L_E$ and a width $W_E$, and each side wall 22 has a length $L_S$ and a width $W_S$. For purposes of this disclosure, the width of each wall is measured horizontally along the base 14 in a plane of the wall being measured. Each length $L_E$, $L_S$ is defined vertically when the console 10 is in the deployed configuration and horizontally in the stowed configuration. The width $W_E$, $W_S$ of each wall 20, 22 is essentially the same in the deployed and stowed configurations, but the length $L_E$, $L_S$ changes between the two configurations. The length $L_E$, $L_S$ of each wall 20, 22 may be greater in the deployed configuration than in the stowed configuration. For example, the length $L_E$, $L_S$ of each wall 20, 22 may be 10% to 100% greater in the deployed configuration than in the stowed configuration. In some cases, each deployed lengths $L_E$, $L_S$ may be twice the corresponding stowed length. As shown in FIG. 1, the deployed lengths $L_E$, $L_S$ may define the deployed height H of the collapsible body 12.

The collapsible body 12 has a lower end attached to the base 14 and an upper end attached to the lid 16 or annular rim 18. In this example, all four of the walls 20, 22 are hingedly attached to the base 14 for pivotal movement about respective pivot axes. The end walls 20 are hingedly attached to the annular rim 18 for pivotal movement about respective pivot axes, and the side walls 22 are releasably attached to the annular rim. In the illustrated example, all of the hinged attachments are configured so that the respective wall 20, 22 pivots inward over the base 14 when the console changes from the deployed configuration to the stowed configuration. In particular, the lower panel 28, 32 of each wall 20, 22 pivots inward over the base, and the upper panel 26 of each end wall 20 pivots inward over the base.

Figure 2:
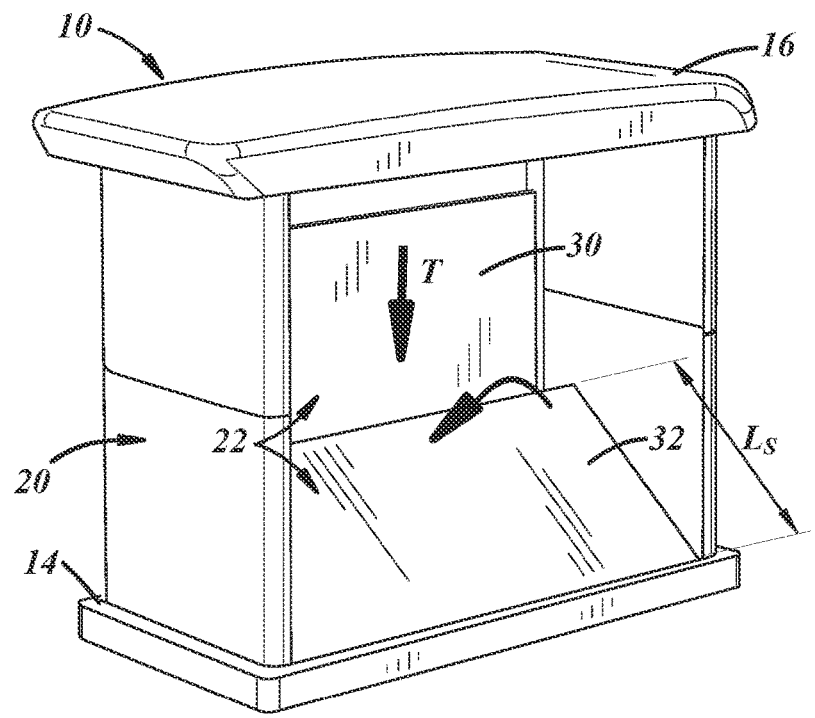
FIG. 2 depicts the vehicle interior console of FIG. 1 during a change to a stowed configuration, with a side wall pivoted inwardly over a base.

FIGS. 1-4 illustrate a sequence in which the console 10 is changed from the deployed configuration to the stowed configuration. Starting from the deployed configuration of FIG. 1, each side wall 22 is detached from the annular rim 18 with the upper panel 30 sliding along the lower panel 32 in direction T to thereby reduce the length $L_S$ of each side wall 22, as illustrated in FIG. 2. In FIG. 2, the wall 22 in the foreground has been transformed to its stowed length $L_S$ with the upper panel 30 (not visible) and the lower panel 32 completely or nearly completely overlapping (FIG. 1), and the transformed wall is partly rotated toward its horizontal stowed position. The wall 22 in the background of FIG. 2 is transitioning to its stowed length while still vertically oriented.

Figure 3:
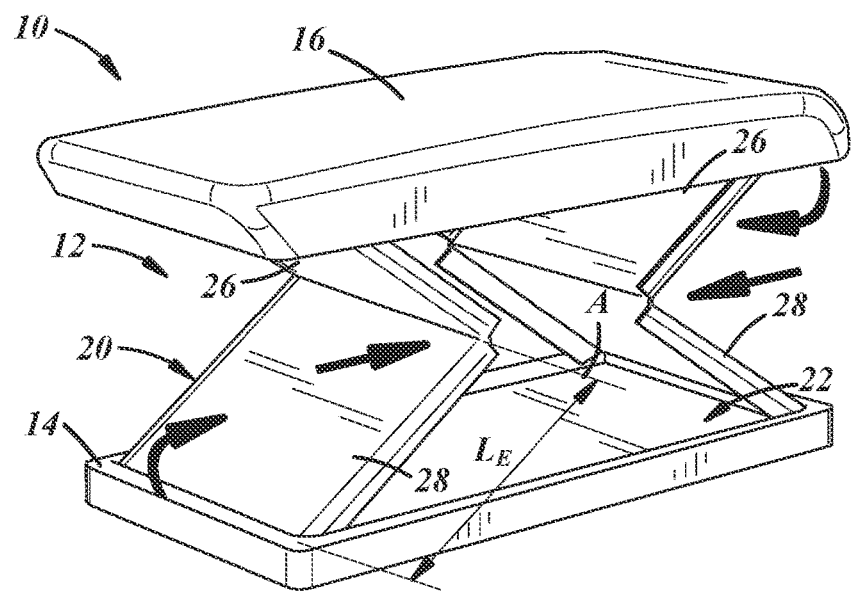
FIG. 3 depicts the vehicle interior console of FIG. 1 with two side walls extending horizontally over the base and two end walls partially folded over the base.

FIG. 3 illustrates both of the side walls 22 stowed in or on the base 14 while each end wall 20 is partially folded along the respective pivot axis A. Both the upper and lower panels 26, 28 pivot inwardly over the base 14 about respective upper and lower pivot axes at the annular rim 18 and base. The stowed length $L_E$ of each folding end wall 20 is defined even before the end walls 20 reached their stowed position.

Figure 4:
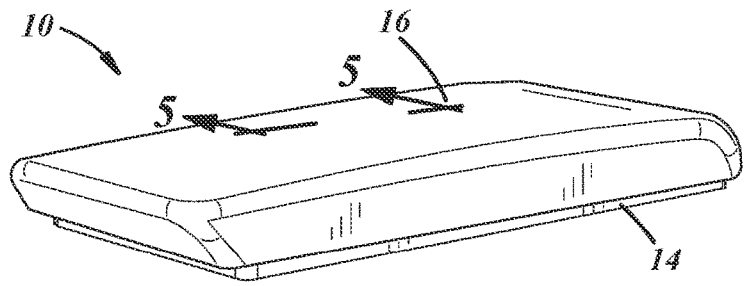
FIG. 4 depicts the vehicle interior console of FIG. 1 in the stowed configuration.
Figure 5:
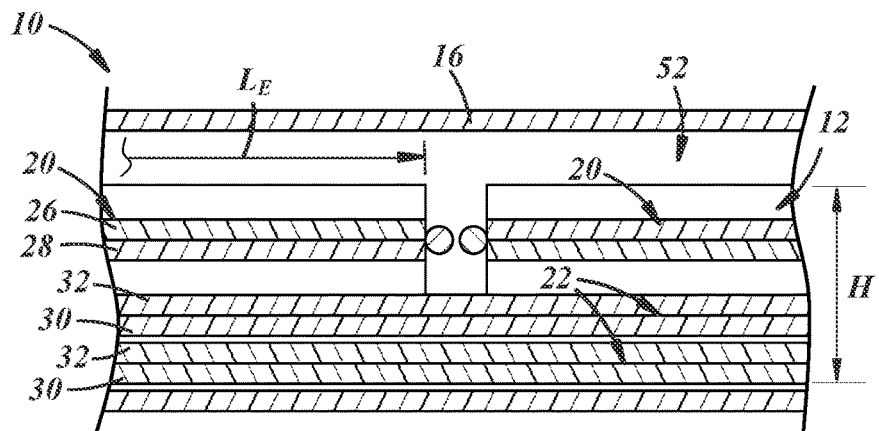
FIG. 5 is a partial cross-sectional side view of the vehicle interior console taken along line 5-5 of FIG. 4.

FIGS. 4 and 5 illustrate the console 10 in the stowed configuration in which each wall 20, 22 is horizontal and about half its deployed length. All of the walls 20, 22 are within the footprint and inner perimeter of the base 14 when in the stowed configuration without any of the walls or their respective panels 26-32 being removed from the console 10 during the transition. In the stowed configuration of FIG. 5 each end wall 20 overlaps both side walls 22 with the respective upper and lower panels 26-32 of each wall also overlapping each other. The height H of the collapsible body 12 in the stowed configuration is approximately the sum of the thickness of the upper and lower panels 30, 32 of both side walls 22 and the thickness of the upper and lower panel 26, 28 of one end wall 20. A hollow portion along the underside of the lid 16 may partially define a reduced storage volume 52 in the stowed configuration in which vehicle occupants can store small items even when the console 10 is in the stowed configuration. The lid 16 may completely conceal the collapsed body 12 and the base 14 in some embodiments.

Figure 6:
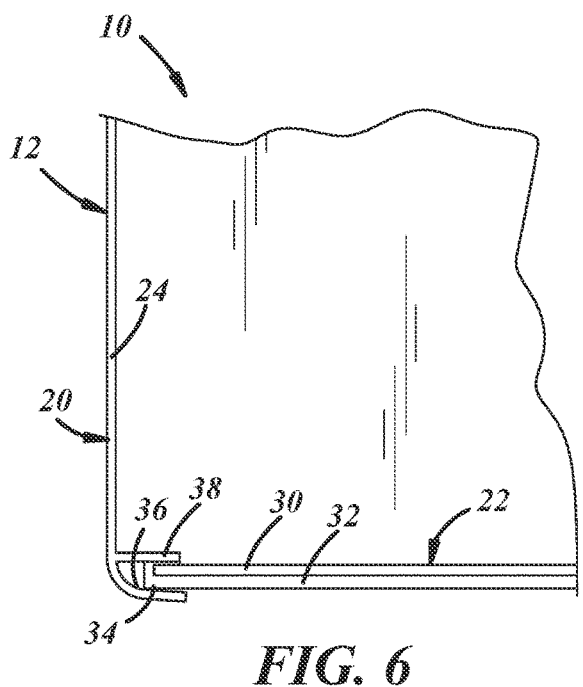
FIG. 6 is a top view of the vehicle interior console of FIG. 1.

The console 10 may include one or more features that help maintain the stability of the collapsible body while in the deployed configuration. FIG. 6 is a top view of one corner of the console 10 of FIG. 1 with the annular rim 18 omitted to show the top of the collapsible body 12 and the junction of an end wall 20 and a side wall 22. FIG. 6 illustrates two stability features. The first feature prevents the foldable end wall 20 from folding inwardly toward the stowed configuration when the console is in the deployed configuration and includes an end 34 of the side wall 22 abutting a surface 36 of the end wall 20 when in the deployed configuration. Stated differently, each end wall 20 extends transversely outward far enough to overlap the end 34 of each side wall 22. Here, the surfaces that are abutting are provided by the end of the lower panel 32 and by a curved interior surface 36 of the end wall 20, which as shown in FIGS. 2 and 3, may extend along the full length $L_E$ of the end wall. In conjunction with a one-way hinge joint along the pivot axis A, the deployed end wall is thus prevented from collapsing until the side walls 22 are in their horizontal stowed positions as in FIG. 3.

Figure 7:
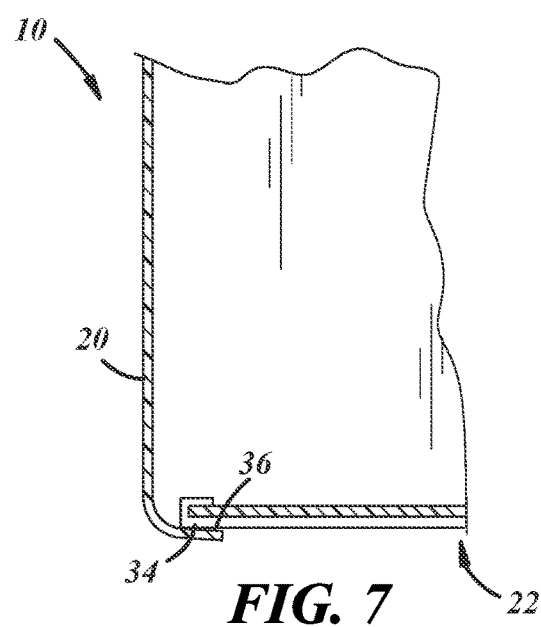
FIG. 7 is a partial cross-sectional front view of the vehicle interior console taken along line 7-7 of FIG. 1.

The second stability feature 38 illustrated in FIG. 6 prevents the side wall 22 from pivoting inward about its pivot axis at the base 14 when in the deployed configuration. In this example, the stability feature is a protrusion 38 (e.g., a tab or rib) along the inner side of the end wall 20 that captures the top of the side wall 22 between the protrusion and the interior surface 36. Where employed, the protrusion 38 is only necessary at the top of the side wall 22 to capture the upper panel 30 of the wall but may extend downward along more of the upper panel 30, stopping short of the lower panel 32. Other stability features are contemplated. Partly visible in the top view of FIG. 6 is the U-shape of the end 34 of the lower panel 32, which acts as the sliding attachment between the upper and lower panels 30, 32. This feature is shown more clearly in the cross-sectional view of FIG. 7.

Figure 8:
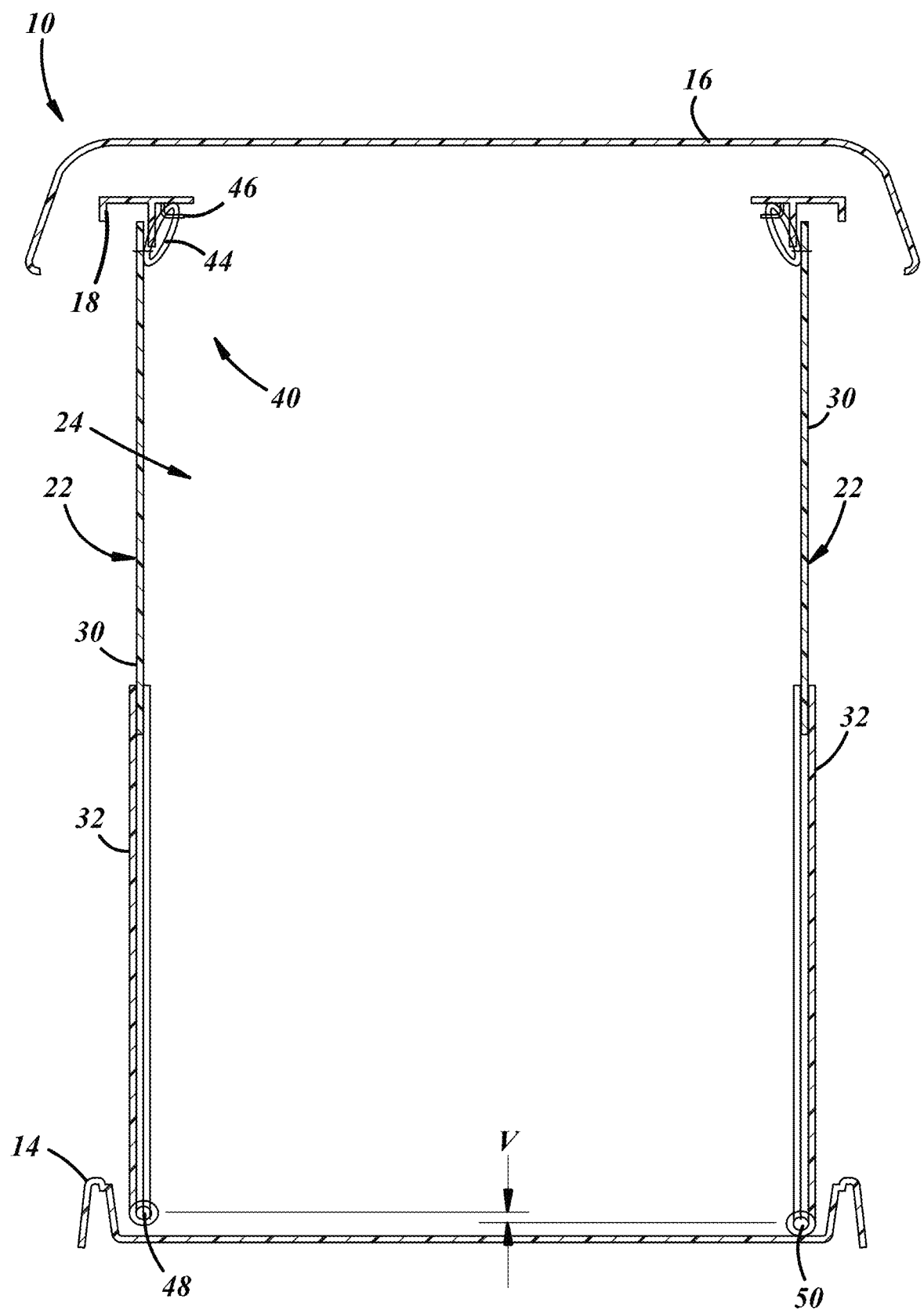
FIG. 8 is a partial cross-sectional top view of the vehicle interior console taken along line 8-8 of FIG. 1.

The stability feature 38 preventing the side walls 22 from pivoting inwardly over the base 14 while in the deployed configuration may be additionally or alternatively included in the annular rim 18, as illustrated in FIG. 8. Here, the protrusion or tab 38 extends downwardly along the bottom side of the annular rim 18.

Another stability feature illustrated in FIG. 8 is a releasable attachment 40. As noted above, the side walls 22 may be releasably attached to the annular rim 18. A releasable attachment 40 is any temporary attachment mechanism that can be detached and reattached multiple times, usually for the life of the product. Examples include, but are not limited to, Velcro®, elastic loops, magnets, or releasable snap tabs. The releasable attachment 40 includes complimentary first and second attachment features 44, 46. In this example, the first attachment feature is an elastic loop 44 affixed to the inner side of the upper panel 30 of the side wall 22, and the second attachment feature is a pin or hook 46 extending from the annular rim 18. The releasable attachment 40 can be operated by a user opening the lid 16 and reaching into the top of the storage volume 24 beneath the annular rim 18 to unhook the loop 44 from the hook 46. As suggested above, the first and second complimentary attachment features may include the hook side and the loop side of a hook-and-loop fastener (e.g. Velcro®), a magnet and ferromagnetic piece, tabs and slots, etc. Latches of the type often used to temporarily fasten the moveable end of the lid to the body of the console are also contemplated.

The releasable attachment 40 enables another feature of the console, which is lateral access to the storage volume 24. For example, if a user wishes to access the storage volume or make the storage volume accessible from the side, one of the upper panels 30 can be released from the annular rim 18 and slid down along the corresponding lower panel 32.

In some embodiments, the releasable attachment is omitted. For example, the sliding attachment between the upper and lower panels 30, 32 of the sidewall 22 may include sufficient friction to support the upper panel with the wall in the extended condition without the need for an attachment to the annular rim.

Another feature illustrated in FIG. 8 is a vertical offset V between pivot axes 48, 50 about which the two side walls 22 pivot when changing to the stowed configuration. Since the side walls 22 have a non-zero thickness, the offset pivot axes 48, 50 ensure that the surfaces of the walls are parallel when stacked over one another in the stowed configuration. While not shown in FIG. 8, the pivot axis about which the lower panel 28 of each end wall 20 pivots may vertically offset above the illustrated pivot axes 48, 50.

It should be noted that some features are omitted and/or illustrated schematically for ease in understanding the invention. For example, each wall, panel, and/or lid of the console may be a multilayer component including a decorative layer of material over a rigid or semi-rigid substrate to provide a desire aesthetic. It is also noted that, as used herein, "hingedly attached" is intended to cover all types of pivot joints permitting rotation of one component relative to another about an axis of rotation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior console comprising a plurality of walls and an annular rim, the console being changeable between a deployed configuration, in which each wall is vertical, and a stowed configuration, in which each wall is horizontal,
    wherein the plurality of walls defines a collapsible body having a length, a width, and a height when the console is in the deployed configuration, the height being greater than the length, the width, or both the length and the width, and
    wherein one of the walls is hingedly attached to the annular rim and another one of the walls is releasably attached to the annular rim when the console is in the deployed configuration.

2. The vehicle interior console of claim 1, wherein the plurality of walls defines a perimeter of a storage volume when the console is in the deployed configuration, the console further comprising a lid that is movable between a closed position, in which the storage volume is not accessible, and an open position in which the storage volume is accessible.

3. The vehicle interior console of claim 2, wherein one of the walls has a first portion that is movable relative to a second portion to provide lateral access to the storage volume when the console is in the deployed configuration.

4. The vehicle interior console of claim 1, further comprising a base, wherein one of the walls is hingedly attached to one side of the base and another one of the walls is hingedly attached to another side of the base, at least a portion of each wall pivoting inward over the base when the console is changed from the deployed configuration to the stowed configuration so that the walls overlap in the stowed configuration.

5. The vehicle interior console of claim 4, wherein each wall is hingedly attached to the base for movement about a respective pivot axis, one axis being vertically offset from another axis so that each wall is parallel with another wall when the console is in the stowed configuration.

6. The vehicle interior console of claim 1, wherein each wall includes an upper panel and a lower panel movably attached to each other, the upper panel and the lower panel moving relative to each other when the console is changed between the deployed configuration and the stowed configuration so that each wall has a length that is greater in the deployed configuration than in the stowed configuration.

7. The vehicle interior console of claim 6, wherein at least one of the walls is a foldable wall in which the upper panel and lower panel are hingedly attached to each other, the foldable wall being unfolded when the console is in the deployed configuration and folded so that the upper and lower panels overlap when the console is in the stowed configuration.

8. The vehicle interior console of claim 6, wherein at least one of the walls is a retractable wall in which the upper panel and lower panel are slidingly attached to each other, the retractable wall being extended when the console is in the deployed configuration and retracted so that the upper and lower panels overlap when the console is in the stowed configuration.

9. The vehicle interior console of claim 8, wherein the lower panel is positioned above the upper panel when the console is in the stowed configuration.

10. The vehicle interior console of claim 1, wherein the height of the collapsible body is at least 50% greater than the width when the console is in the deployed configuration.

11. The vehicle interior console of claim 1, wherein the console is not removable from a vehicle in which the console is installed.

12. The vehicle interior console of claim 1, further comprising a base,
    wherein the annular rim is arranged over the base, and
    wherein the collapsible body extends between the base and the annular rim and includes two end walls and two side walls that together define a perimeter of a storage volume when the console is in the deployed configuration, each wall having a length that is greater in the deployed configuration than in the stowed configuration, and
    wherein each wall is hingedly attached to at least one of the base or the annular rim and pivots inwardly over the base when the console is changed from the deployed configuration to the stowed configuration.

13. The vehicle interior console of claim 12, wherein opposite ends of each side wall abut inner surfaces of the end walls in the deployed configuration.

14. A vehicle interior console comprising a plurality of walls, a base, and an annular rim arranged over the base, the console being changeable between a deployed configuration, in which each wall is vertical, and a stowed configuration, in which each wall is horizontal,
    wherein the plurality of walls defines a collapsible body having a length, a width, and a height when the console is in the deployed configuration, the height being greater than the length, the width, or both the length and the width,
    wherein the collapsible body extends between the base and the annular rim and includes two end walls and two side walls that together define a perimeter of a storage volume when the console is in the deployed configuration, each wall having a length that is greater in the deployed configuration than in the stowed configuration,
    wherein each wall is hingedly attached to the base and pivots inwardly over the base when the console is changed from the deployed configuration to the stowed configuration,
    wherein each side wall is retractable from an extended condition in the deployed configuration to a retracted condition in the stowed configuration, and
    wherein each end wall is hingedly attached to the annular rim and folds from an unfolded condition in the deployed configuration to a folded condition in the stowed configuration.

15. A vehicle interior console comprising a plurality of walls, the console being changeable between a deployed configuration, in which each wall is vertical, and a stowed configuration, in which each wall is horizontal, wherein the plurality of walls defines a collapsible body having a length, a width, and a height when the console is in the deployed configuration, the height being greater than the length, the width, or both the length and the width, wherein each wall includes an upper panel and a lower panel movably attached to each other, the upper panel and the lower panel moving relative to each other when the console is changed between the deployed configuration and the stowed configuration so that each wall has a length that is greater in the deployed configuration than in the stowed configuration, and wherein at least one of the walls is a retractable wall in which the upper panel and lower panel are slidingly attached to each other, the retractable wall being extended when the console is in the deployed configuration and retracted so that the upper and lower panels overlap when the console is in the stowed configuration.

16. The vehicle interior console of claim 15, wherein at least one of the walls is a foldable wall in which the upper panel and lower panel are hingedly attached to each other, the foldable wall being unfolded when the console is in the deployed configuration and folded so that the upper and lower panels overlap when the console is in the stowed configuration.

17. The vehicle interior console of claim 15, wherein the lower panel is positioned above the upper panel when the console is in the stowed configuration.

18. The vehicle interior console of claim 15, wherein the height of the collapsible body is at least 50% greater than the width when the console is in the deployed configuration.

19. The vehicle interior console of claim 15, wherein the console is not removable from a vehicle in which the console is installed.

20. The vehicle interior console of claim 15, further comprising a base and an annular rim arranged over the base, wherein the collapsible body extends between the base and the annular rim and includes two end walls and two side walls that together define a perimeter of a storage volume when the console is in the deployed configuration, and wherein each wall is hingedly attached to at least one of the base or the annular rim and pivots inwardly over the base when the console is changed from the deployed configuration to the stowed configuration.

* * * * *